J. A. PRATTON.
WALKING CULTIVATOR.
APPLICATION FILED AUG. 29, 1916.
1,215,188.
Patented Feb. 6, 1917.
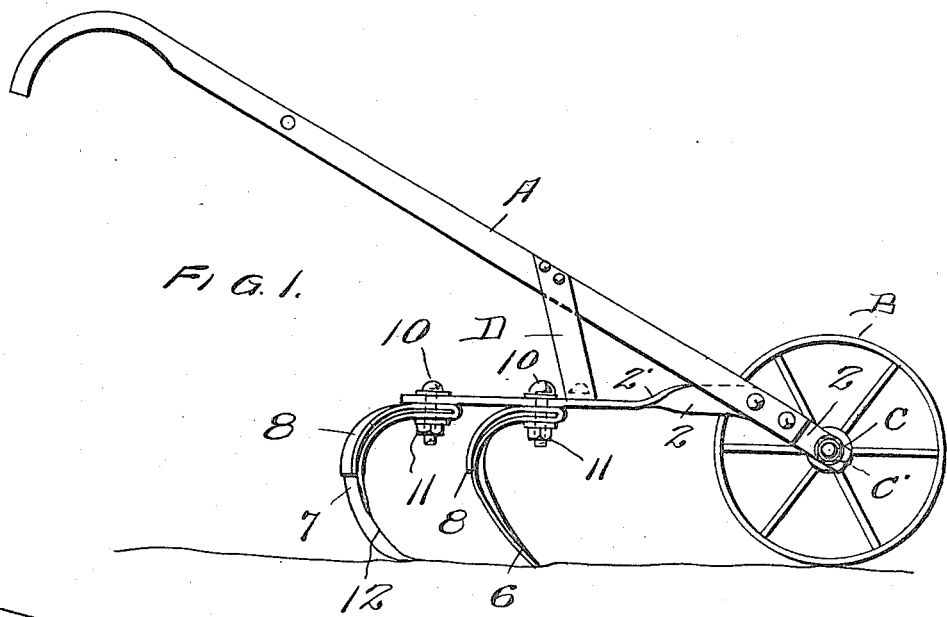
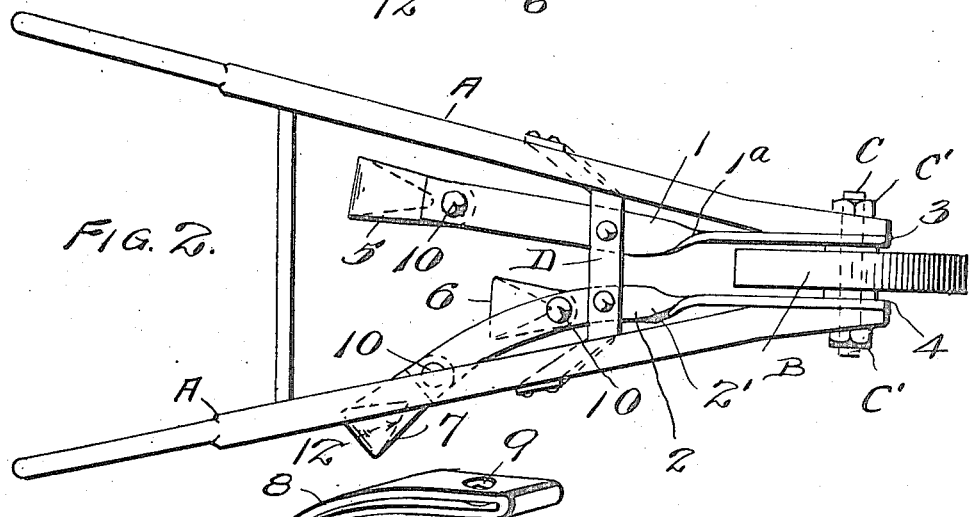
INVENTOR
J. A. PRATTON
By Herman A. Phillips
Attorney.

UNITED STATES PATENT OFFICE.

JOHN A. PRATTON, OF TRENT, OREGON.

WALKING-CULTIVATOR.

1,215,188. Specification of Letters Patent. Patented Feb. 6, 1917.

Application filed August 29, 1916. Serial No. 117,462.

*To all whom it may concern:*

Be it known that I, JOHN A. PRATTON, a citizen of the United States of America, residing at Trent, in the county of Lane and State of Oregon, have invented new and useful Improvements in Walking-Cultivators, of which the following is a specification.

The present invention relates to improvements in walking cultivators, of the hand type, and is designed particularly for the purpose of providing an implement of this character which is comparatively simple in construction and operation, which is inexpensive in cost of production, durable, and capable of performing its required functions in a comparatively perfect manner.

The invention consists in certain novel combinations and arrangements of parts as will be hereinafter more fully set forth and claimed.

In the accompanying drawings I have illustrated one complete embodiment of my invention, constructed according to the best mode I have so far devised for the practical application of the principles of the invention.

In the drawings:

Figure 1 is a side elevation of an implement embodying my invention.

Fig. 2 is a top plan view of the implement of Fig. 1.

Fig. 3 is a perspective view of an enlarged tooth.

In the preferred embodiment of my invention, as illustrated in the drawings, I have utilized the usual or standard plow handles A in connection with the cultivator wheel B, and the bolt C which is passed through the ends of the handles and forms the journal upon which the wheel B revolves, is held in place by the retaining nuts C' C'.

The cultivator frame is made up of a pair of metallic straps 1 and 2 which are twisted as at 1ª and 2', and the forward ends 3 and 4 of these metallic straps are perforated for the passage of the bolt C, and the two straps or frame are attached to the handles A by means of this bolt C, and the U-shaped bracket or brace D, which is bolted or riveted to the two members 1 and 2 and also attached to the outsides of the handle bars A A. In this manner the above enumerated parts are connected to form a rigid and strong implement adapted to carry the cultivator teeth.

I have indicated in the drawings three teeth and designated them 5, 6, and 7. These teeth are made of sheet metal properly tempered and formed to the desired shape, as shown in Fig. 3, and to strengthen them and give them the required resiliency, I preferably bend back the material of the teeth upon itself as indicated at 8, and the upper portion of the tooth is perforated as at 9 for the fastening bolt 10. The bolt 10 is passed through the strap 1 or 2 and also through the tooth and in each case the bolts are retained by means of the clamping nuts 11. The bent portion 8 of the tooth provides a reinforcement for the tooth, and also permits the desired resiliency to the tooth.

The teeth 5 and 6 are of similar construction, but attached to the different arms or straps of the frame. The tooth 7, which is located at the outer end of the strap 2, is of particular construction, in that its sharpened edge 12 is turned somewhat toward the front of the implement, as shown in Fig. 2, in order that this tooth may perform the functions of a weed cutter as well as the cultivator. When equipped with this tooth 12, the implement may be used as a cultivator, and also for the purpose of cutting weeds as will be readily understood.

From the above description taken in connection with my drawings, it is evident that I have provided an implement which fulfils the purpose and object of my invention as before stated.

What I claim is:

In a walking cultivator the combination of a supporting wheel and a tooth frame, comprising a pair of twisted metallic straps one of which is located each side the wheel, said straps diverging toward the rear, a tooth secured at the end of each said strap and an intermediate tooth secured to one of the straps, and one of said outer teeth having a cutting edge toward the front of the implement.

In testimony whereof I affix my signature.

JOHN A. PRATTON.